United States Patent
Kashino

(10) Patent No.: US 6,713,698 B2
(45) Date of Patent: Mar. 30, 2004

(54) KEY TOP AND METHOD OF MANUFACTURE

(75) Inventor: Masayuki Kashino, Iwatsuki (JP)

(73) Assignee: Polymatech Co., Ltd., Tokyo (JP)

( * ) Notice: Subject to any disclaimer, the term of this patent is extended or adjusted under 35 U.S.C. 154(b) by 30 days.

(21) Appl. No.: 10/397,729

(22) Filed: Mar. 26, 2003

(65) Prior Publication Data

US 2003/0183495 A1 Oct. 2, 2003

(30) Foreign Application Priority Data

Mar. 29, 2002 (JP) ........................................ 2002-097067

(51) Int. Cl.[7] .......................... H01H 3/12; H01H 9/00; B32B 27/00; B32B 3/00; B29C 45/00
(52) U.S. Cl. .................... 200/341; 29/527.1; 29/622; 200/310; 200/314; 264/132; 264/259; 428/189
(58) Field of Search ................. 200/308–317, 200/512–517, 341–345; 400/490–495; 264/132–349; 29/257.1, 622; 428/189

(56) References Cited

U.S. PATENT DOCUMENTS

| | | | | |
|---|---|---|---|---|
| 5,681,515 A | * | 10/1997 | Pratt et al. ................. | 264/153 |
| 5,911,317 A | * | 6/1999 | Tsai ........................... | 200/514 |
| 6,111,324 A | * | 8/2000 | Sheppard et al. ........... | 257/787 |
| 6,284,569 B1 | * | 9/2001 | Sheppard et al. ........... | 438/110 |
| 6,322,875 B1 | * | 11/2001 | Kimura ..................... | 428/195.1 |
| 6,382,855 B1 | * | 5/2002 | Katori ........................ | 400/494 |
| 2001/0051254 A1 | * | 12/2001 | Katori et al. ............... | 428/189 |
| 2003/0108720 A1 | * | 6/2003 | Kashino ..................... | 428/189 |

FOREIGN PATENT DOCUMENTS

| | | | | |
|---|---|---|---|---|
| EP | 1316978 A1 | * | 6/2003 | .......... H01H/13/70 |
| JP | 8-7698 A | | 1/1996 | |

\* cited by examiner

Primary Examiner—James R. Scott
(74) Attorney, Agent, or Firm—Crompton, Seager & Tufte, LLC

(57) ABSTRACT

A key top including a resin film, a key top body made of resin and being covered by the resin film except for the rear surface thereof, and a first extending portion extending outward from the peripheral surface of the key top body. A gate mark formed by a mold and a vent mark formed by a mold which are located on the rear surface of the first extending portion. The rear surfaces of the key top body and the first extending portion are flat and located rearward from the rear surface of the resin film.

20 Claims, 3 Drawing Sheets

KEY TOP AND METHOD OF MANUFACTURE

BACKGROUND OF THE INVENTION

The present invention relates to the key top of a press button switch mounted on a variety of electronic devices, such as communication devices, which include cellular phones and automobile phones, and audio devices.

In the prior art, it is desired that electronic devices including mobile communication terminals, such as a cellular phone or an automobile phone, be light and compact. Accordingly, it is desirable that press button switches used in such electronic devices also be light, compact, and thin. To satisfy such desires, a key top is used in the art having a translucent body and a translucent resin film adhered to all the surfaces of the body, except for the rear surface. Such a key top is widely used nowadays.

FIG. 6 is a cross sectional view of a prior art key top. The key top comprises a key top body 32 made of a translucent resin and a translucent resin film 31 adhered to the outer surface of the key top body 32, except for the rear surface 32a. This forms a press button 35, which projects frontward from the resin film 31 of the key top. Further, a graphical symbol layer 33 is arranged between the film 31 and the body 32, which form the press button 35, to display a graphical symbol, such as a character, on the press button 35. The film 31 is typically shaped corresponding to a profile of the key top body 32. Then, resin is injected into the shaped film 31 to manufacture the key top. Therefore, the rear surface 32a of the key top body 32 has a gate mark 34 at a position corresponding to a gate, through which resin is injected when injection molding the body 32.

In recent years, the variety of designs for such a key top has increased drastically. For example, press buttons used in cellular phones have a wide variety of designs. Under such circumstances, such a key top is required to be designed with high quality and superior visibility of the graphical symbol on the front surface of the key top.

Currently, however, the key top has the gate mark 34 on the rear surface of the key top body 32. Therefore, the gate mark 34 is visible through the film 31 and the key top body 32 when viewing the key top body 32 from the front of the press button 35. This affects the appearance of the current key top in an undesirable manner. The gate mark 34 may distort the image of the graphical symbol layer 33 formed on the rear surface of the resin film 31 when viewing the graphical symbol from the front of the press button 35. That is, the gate mark 34 impairs the visibility of the graphical symbol layer 33, which provides the graphical symbol to the press button 35 of the key top. This reduces the aesthetic appeal of the key top.

To solve this problem, the gate mark 34 may be arranged in a peripheral portion of the key top body 32 at a position where the gate mark 34 does not oppose the graphical symbol layer 33, as shown by broken lines in FIG. 6. However, in this layout, the gate mark 34 is still visible from the front of the press button through the key top body 32. Thus, such a layout does not solve the above problem.

Referring to FIG. 7, Japanese Laid-Open Patent Publication No. 8-7698 discloses a key top body 32 having a rear surface projected further rearward from the rearmost surface of a resin film 31. The key top body 32 also has an extending portion 36 extending outward from the outer periphery of the projected portion of the key top body 32. A gate mark 34 is formed on the extending portion 36.

The above key top is formed by performing injection molding. The material of the key top body 32 is injected into a recess formed in the film with the desired shape. When molten resin is injected into the cavity of a mold through a gate, the air remaining in the cavity prevents the cavity from being completely filled with the molten resin in a uniform manner. This causes the outer surface of the molded key top boy 32 to become uneven and unsmooth. As a result, the aesthetic appeal of the key top is reduced.

BRIEF SUMMARY OF THE INVENTION

The present invention is directed to deal with the drawbacks abovementioned.

In one aspect of the present invention, a key top comprises a resin film having a front surface and a rear surface; a key top body made of resin, said key top body having a rear surface and a peripheral surface, said key top body being covered by the resin film except for the rear surface thereof; and a first extending portion having a rear surface and extending outward from the peripheral surface of the key top body. The first extending portion includes a gate mark formed by the mold gate and a vent mark formed by the mold vent when molding the key top body, which are located on the rear surface of the first extending portion. The rear surface of the key top body and the rear surface of the first extending portion are flat and extend along a plane located rearward from the rear surface of the resin film.

In another aspect of the present invention, a mold for forming a key top by injecting resin therein is provided. The mold comprises (a) an upper mold section including a first cavity formed in the upper mold section, the first cavity having a rim from which a step-out recess extends, surrounding the first cavity, and the step-put recess having a depth less than that of the first cavity; and (b) a lower mold section adapted to mate with the upper mold section, the lower mold section including a second cavity formed in the lower mold section, the second cavity having an area that opposes the step-out recess when the mold sections mate together. Said area includes a gate for injecting resin into the cavities when the mold sections mate together, and a vent for venting gas from the cavities as resin is injected.

In still another aspect of the invention, a method of forming a key top is provided. The method comprises (a) injecting resin in non-solid form into a mold to form a key top body with the key top body including an outwardly extending portion, from where the resin is injected and from which gas is vented, and the resin being translucent when solidified; (b) solidifying the resin; (c) forming a graphic symbol on a translucent resin film; and (d) fusing the translucent resin film to the upper surface of the key top body. The graphic symbol is surrounded by the extending portion from a plan view of the key top body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment according to the present invention will now be described with reference to FIGS. 1 and 2.

Figure 1:
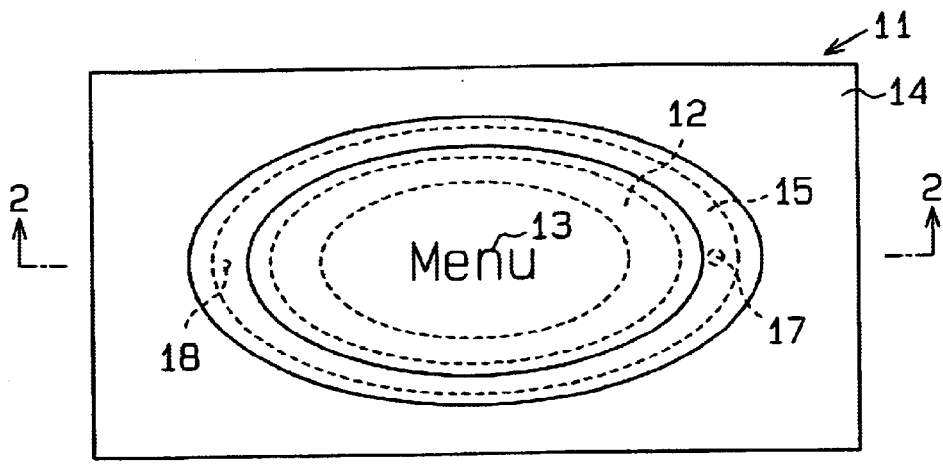
FIG. 1 is a plan view showing a key top according to a first embodiment of the present invention.
Figure 2:
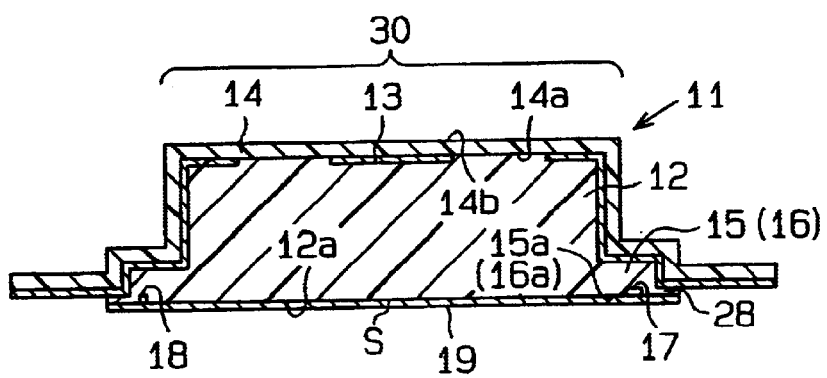
FIG. 2 is a cross sectional view taken along line 2—2 in FIG. 1.

Referring to FIGS. 1 and 2, a key top 11 of the first embodiment includes a generally oval cylinder key top body 12 and a resin film 14, which is adhered to the surface of the key top body 12 except the rear surface 12a. The key top body 12 and the resin film 14 form a press button 30. Further, a graphical symbol layer 13 is formed on a rear surface 14a of the resin film 14. The key top body 12 is formed by injection molding a translucent synthetic resin into the form of the press button 30.

The composition, type, and color of the resin forming the key top body 12 are not limited as long as the resin is translucent. Such a resin is selected from known synthetic resins, such as a thermoplastic resin, a thermoplastic elastomer, a setting resin, or a cross-linking rubber, in accordance with the required performance. It is preferred that a setting resin, which is suitable for molding, be used. It is especially preferred that a polycarbonate resin, an acrylic resin, or a polypropylene resin, which have satisfactory translucency, mechanical strength, and heat resistance, be used.

Figure 3:
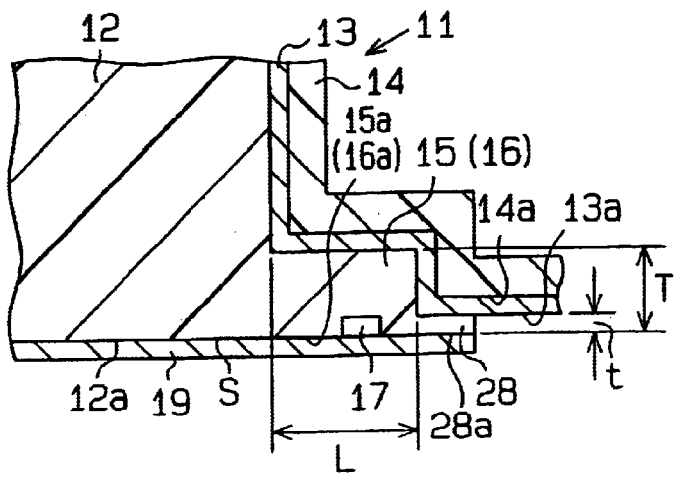
FIG. 3 is an enlarged cross sectional view of an extending portion in the key top.

A flange 15 extends radially outward by length L from the peripheral surface around the rear end of the key top body 12, as shown in FIGS. 2 and 3. The rear surface 12a of the key top body 12 and a rear surface 15a of the flange 15 are both flat and extend along the same plane S. The plane S is located rearward from the rear surface 14a of the translucent resin film 14. More specifically, in the first embodiment, the plane S is spaced rearward from the rearmost portion of the rear surface 13a of the graphical symbol layer 13 by a distance corresponding to thickness t. The portion with thickness t extends radially outward from the flange 15 and forms an extension 28.

A rear surface 28a of the extension 28 extends along the same plane S as the rear surface 15a of the flange 15, as shown in FIG. 3. A gate mark 17 is disposed on the rear surface 15a of the flange 15 at a position corresponding to a gate, through which resin is injected when molding the key top body 12.

Figure 6:
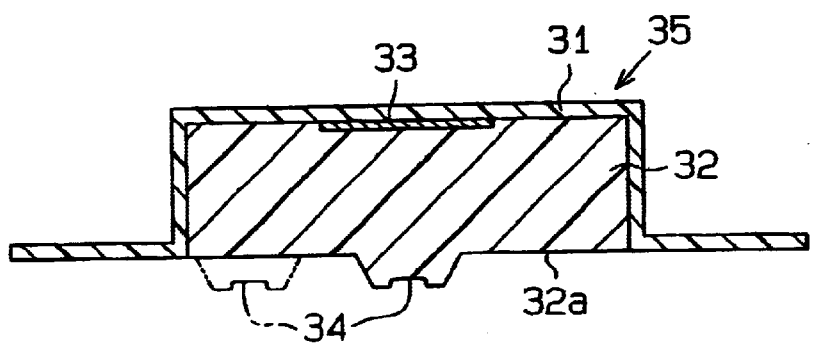
FIG. 6 is a cross sectional view showing a prior art key top.
Figure 7:
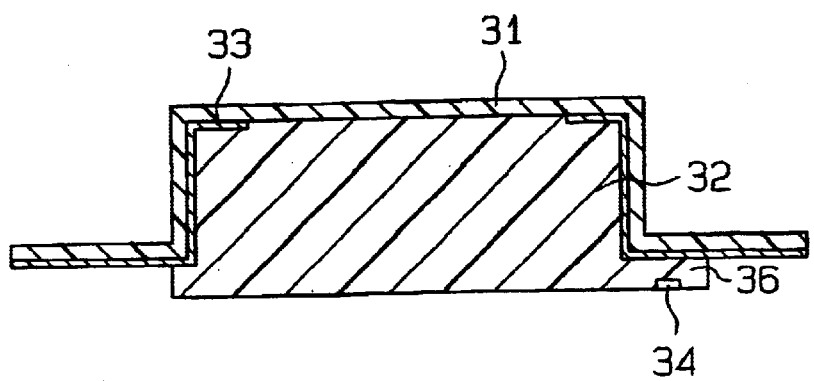
FIG. 7 is a cross sectional view showing another prior art key top.

Since the rear surface 12a of the key top body 12 is located rearward from the rear surface 14a of the resin film 14 as described above, a decorating layer 19 can be formed easily on the rear surface 12a of the key top body 12. This increases yield and mass productivity in the manufacturing process of the key top 11. In contrast, in the prior art key top, the rear surface of the key top body 32 is flush with the rear surface of the resin film 31, as shown in FIG. 6. In such a case, when printing a decorating layer on the rear surface of the key top body 32 with ink or paint, a solvent of the ink or paint infiltrates along an interface between the key top body 32 and the resin film 31. This deteriorates the adhesion strength between the key top body 32 and the resin film 31. Therefore, the formation of the decorating layer must be accurately controlled to prevent the solvent from infiltrating along the interface between the key top body and the resin film. This decreases productivity.

For this reason, it is preferred that the thickness t corresponding to the distance, in which the key top body 12 projects rearward from the resin film, be greater than or equal to 0.05 mm. When the thickness t is greater than or equal to 0.05 mm, the solvent is prevented from infiltrating along the interface between the key top body 12 and the resin film 14.

Since the flange 15 is arranged along the entire periphery of the key top body 12, stress is uniformly applied to the entire resin film 14 when the resin film 14 is deformed corresponding to the outer shape of the key top body 12. Therefore, the translucent resin film 14 is stretched uniformly along the entire periphery of the key top body 12. This improves yield when the molding of the key top 11.

It is preferred that the thickness T of the flange 15 shown in FIG. 3 be at least 0.2 mm to facilitate the molding of the key top body 12 although this depends on the size and shape of the key top body 12. When the thickness T is at least 0.2 mm, the translucent resin film 14 or a decorating layer 19, which is formed on the rear surface 14a of the resin film 14 (described later), is prevented from being melted, deformed, and ruptured by the hot molten resin injected through a resin injection gate.

Furthermore, the rear surface 15a of the flange 15 also has a vent mark 18 corresponding to an air vent, which is used when injection molding the translucent key top body 12. The air vent is used to externally discharge gas, which is generated in the cavity of a mold (described later), when molding the key top body 12. Due to the gate mark 17 and the vent mark 18, which are located on the rear surface 15a of the flange 15, the rear surface 12a of the key top body 12 is flat and even. This facilitates forming an additional layer, such as a decorating layer 19, on the rear surface 12a of the key top body 12, thereby providing the key top 11 with design diversity.

The gate mark 17 and the vent mark 18, which are located as described above, are not visible through the graphical symbol layer 13 when viewing the graphical symbol layer 13 from the front of the press button 30 of the key top 11. This prevents the occurrence of distortion in graphical symbols presented by the graphical symbol layer 13 when viewing the key top 11, and improves the appearance of the key top 11.

The gate mark 17 and the vent mark 18 are formed on the rear surface 15a of the flange 15 and spaced from each other by 180 degrees.

The gate mark 17 and the vent mark 18 are located at positions close to the periphery of the flange 15 such that the gate mark 17 and the vent mark 18 are not visible from the front of the key top 11. Further, it is preferred that the thickness T of the flange 15 be smaller than its length L, by which the flange 15 extends radially outward, for the same reason described above.

Part of the translucent resin film 14 is deformed to generally conform to the profile of the key top body 12 and adheres to the surface of the key top body 12 except for the rear surface 12a. Accordingly, in the key top 11, the resin film 14 and the key top body 12 form a press button 30 projected toward the front.

A translucent film is used as the resin film 14. The composition, type, and color of the film are not restricted as long as it is translucent. The film is selected from known resin films in accordance with the required properties. It is preferred that thermosetting resin film, which is suitable for molding, be used as the resin film 14. It is especially preferred that a polycarbonate resin film, a polyethylene terephthalate resin film, or a polyethylene naphthalate resin film, which have satisfactory translucency, be used as the resin film.

Figure 5:
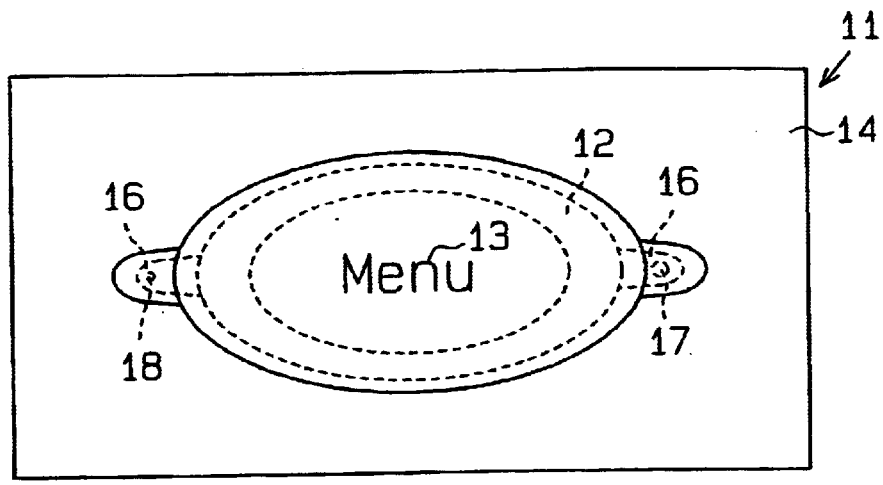
FIG. 5 is a plan view showing a key top according to a second embodiment of the present invention.

The graphical symbol layer 13 is visible through the resin film 14 from the front of the press button 30 and is marked with a graphical symbol, such as a character, a numeral, a symbol, a pattern, or an image. In the first embodiment, the characters "Menu" are marked by the graphical symbol layer 13 on the center of the key top body 12, as shown in FIG. 5. The graphical symbol layer 13 is painted, printed, or transferred with ink or paint onto the rear surface 14a of the translucent resin film 14. A graphical symbol may be drawn on the graphical symbol layer 13 or cut out from the graphical symbol layer 13. The graphical symbol layer 13 is formed on at least one of the front surface 14b and the rear surface 14a of the resin film 14. However, it is preferred that the graphical symbol layer 13 be formed on the rear surface 14a, as shown in FIG. 2, to prevent wear of the graphical symbol layer 13. Further, the gate mark 17 and the vent mark 18, as described above, do not affect the visibility of the graphical symbol layer 13. Therefore, the graphical symbol layer 13 allows the key top to have various designs.

The decorating layer 19 is formed on the rear surface 12a of the translucent key top body 12. The decorating layer 19 is viewed from the front of the press button 30 through the resin film 14 and the key top body 12 and is formed from a colored layer, such as red, blue, yellow, or green; a non-colored layer, such as white, black, or gray; or metallic colored layer. The decorating layer 19 is formed by painting, printing, or transferring with ink or paint onto the rear surface 12a of the key top body 12, or vapor depositing or transferring an inorganic substance onto the rear surface 12a of the key top body 12.

By providing the decorating layer 19 in addition to the graphical symbol layer 13, the decorating layer 19 is visible around the graphical symbol layer 13 and the shadow of characters or the like on the graphical symbol layer 13 falls on the decorating layer 19. Thus, the graphical symbol layer 13 appears to stand out like a three-dimensional image. This enables the key top 11 to have a novel design and widens design variation for the key top 11. The decorating layer 19 may display a graphical symbol, such as a character, a numeral, a symbol, a pattern, or an image.

It is preferred that the decorating layer 19 have a metallic luster. Such a decorating layer 19 having a metallic luster is formed by painting or printing with a paint containing, for example, metal powder (metal ink) or by vapor depositing or transferring metal, such as aluminum, chromium, copper, or nickel. The metallic luster decorating layer 19 improves the aesthetic appearance of the key top 11 and enables the key top 11 to be designed more easily.

Further, it is preferred that the decorating layer 19 be translucent. The translucent decorating layer 19 is formed by, for example, painting or printing with translucent ink or paint, or by vapor depositing a metal, such as aluminum, chromium, copper, or nickel to a thickness of 2 to 300 nm. When the decorating layer 19 is translucent, an illuminator (not shown), such as light-emitting diode (LED) or electroluminescence (EL) device, may be arranged behind the rear surface 12a of the key top body 12 to easily add an illuminating function. This improves the visibility of the key top 11 during night time or in dark places.

An apparatus and a method for manufacturing the key top 11 of the first embodiment will now be described with reference to FIGS. 4(a) and 4(b). Injection molding is performed with an upper mold and a lower mold to form the key top body 12.

Figure 4A:
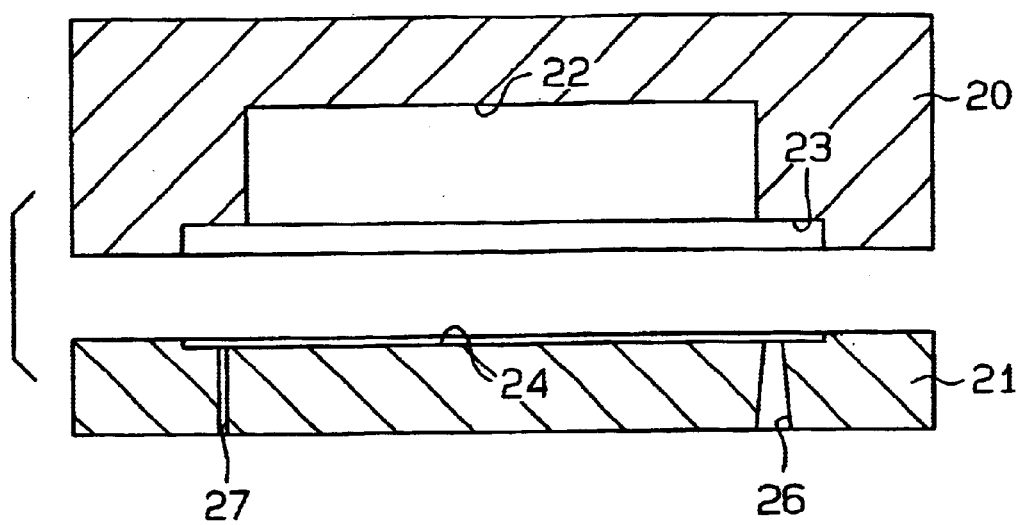
FIG. 4a is a cross sectional view showing a mold in an opened state.
Figure 4B:
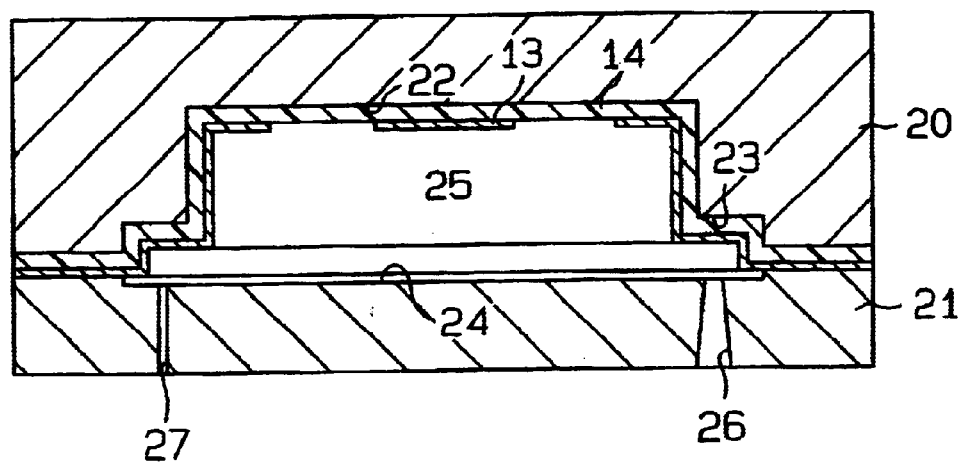
FIG. 4b is cross sectional view showing a mold in a closed state.

Referring to FIG. 4(a), a first cavity 22 is formed in a lower surface of the upper mold 20 to mold the key top body 12. The cavity 22 includes a step-out recess 23 extending along the entire periphery at the opening of the cavity 22 to form the flange 15 of the key top body 12. Accordingly, the cavity 22 has a hat-like shape. The lower mold 21 includes a thin and oval second cavity 24. The first cavity 22, the step-out recess 23, and the second cavity 24 form a cavity 25 corresponding to the shape of the key top body 12.

A gate 26 for injecting the molten resin and a vent 27 for discharging the gas generated in the cavity 25 during injection molding each extend through the lower mold 21. The gate 26 and the vent 27 are located opposing to the step-out recess 23 of the upper mold 20 and are spaced from each other by 180 degrees. Such layout of the gate 26 and the vent 27 effectively discharge gas from the vent 27 during molding.

The resin injection gate 26 may be a pinpoint gate, a fan gate, a film gate, a ring gate, a disk gate, a submarine gate, an overlap gate, a direct gate, a tab gate, or an edge gate. Although there are no restrictions, it is preferred that the resin injection gate 26 be a pinpoint gate to reduce the size of the gate mark 17 formed by the resin injection gate on the key top body 12. It is preferred that the diameter of the vent 27 be between about 0.01 and 0.03 mm.

To produce the key top 11, the graphical symbol layer 13 is first formed on the rear surface 14a of the translucent resin film 14. The translucent resin film 14 is arranged in between the upper mold 20 and the lower mold 21, and then the molds 20,21 are clamped together. Prior to the clamping, it is preferred that part of the translucent resin film 14 is pre-deformed along an inner surface defining the first cavity 22 and step-out recess 23 in the upper mold 20 with a jig such that the translucent resin film 14 generally conforms to the front profile of the key top body 12 that is to be molded.

Subsequently, molten resin is injected into the cavity 25 through the resin injection gate 26 of the lower mold 21. When injecting the molten resin into the cavity 25, the resin film 14 is deformed conforming to the profile of the first cavity 22 and the step-out recess 23 of the upper mold. Since gas, which is generated in the cavity 25 when molding the translucent key top body 12, is discharged out of the cavity 25 through the vent 27, the cavity 25 is uniformly filled with the molten resin. As a result, the key top body 12 and the flange 15 are integrally molded, and the translucent resin film 14 and the translucent key top body 12 are bonded by the thermal fusion. This forms the key top 11. Since the presence of the vent 27 causes the cavity 25 to be filled with molten resin as described above, the key top 11 is easily formed with a smooth surface and aesthetic appearance.

Subsequently, after cooling the upper mold 20 and the lower mold 21, the molds 20 and 21 are separated to remove the molded product. Then, the decorating layer 19 is formed on the rear surface 12a of the key top body 12, or the removed molded product. In this manner, the key top 11 of the first embodiment is manufactured.

A second embodiment according to the present invention will now be described. The description focuses on differences from the first embodiment, and the elements identical to those in the first embodiment will not be described.

Referring to FIG. 5, a pair of generally oval cylinder extending pieces 16 extend radially outward, in the same manner as the first embodiment, along the major axis of the oval cylinder key top body 12 from the rear peripheral portion of the key top body 12. The extending pieces 16 are arranged on opposite sides of the key top body 12 and spaced by 180 degrees from each other.

The rear surface 12a of the key top body 12 and the rear surface 16a of the extending piece 16 are even and flat. A gate mark 17 is formed on a rear surface 16a of one of the extending pieces 16 (right piece in FIG. 5) and a vent mark 18 is formed on a rear surface 16a of the other extending piece 16 (left piece in FIG. 5). Thus, the gate mark 17 and the vent mark 18 are also arranged radially outward from the key top body 12 and spaced from each other by 180 degrees in the second embodiment.

The key top 11 of the second embodiment has the same advantages as the first embodiment.

It should be apparent to those skilled in the art that the present invention may be embodied in many other specific forms without departing from the spirit or scope of the invention. Particularly, it should be understood that the present invention may be embodied in the following forms.

The gate mark 17 and the vent mark 18 may be spaced from each other, for example, by 150 degrees or 90 degrees in the peripheral direction of the key top body 12, if necessary.

The shape of the key top body 12 may be changed to other one, such as cylindrical or box-like. The flange 15, or the cross section of the step-out recess 23, may be changed to have any shapes, such as a part of a circle or rectangular if necessary.

The lower mold 21 may have a plurality of resin injection gates 26 and vents 27. In such a case, molten resin is injected into the entire cavity 25 more uniformly through the resin injection gates 26 and gas is discharged from the cavity more quickly. This enables smooth injection of molten resin.

The graphical symbol layer 13 may be moved on the front surface 14b of the translucent resin film 14 and on the rear surface 12a of the key top body 12.

The portion corresponding to the thickness t between the rear surface 12a of the key top body 12 and the rearmost part of the rear surface 14a may be omitted.

EXAMPLES

The above embodiments will now be described more specifically using examples, which are described below. However, the present invention is not limited to the following examples.

Example 1

In example 1, the key top 11 having the structure of the first embodiment was manufactured.

First, the graphical symbol layer 13 in the form of numeral was printed with black ink on the rear surface 14a of the translucent resin film 14, which was made of polyethylene terephthalate resin. Then, the translucent resin film 14 was drawn with a jig and deformed so that it generally conformed to the front profile of the key top body 12.

The drawn translucent resin film 14 was arranged between the upper mold 20 and the lower mold 21 shown in FIG. 4(a). Then, the molds 20 and 21 were clamped.

Subsequently, molten polycarbonate resin was injected into the cavity 25 through the resin injection gate 26 of the lower mold 21 to form the key top body 12 with the flange 15. Accordingly, the translucent resin film 14 was integrated onto the key top body 12 by thermal fusion. Then, the decorating layer 19 was printed with white paint on the rear surface 12a of the key top body 12 to obtain the key top 11 shown in FIGS. 1 to 3. The rear surface 12a of the key top body 12 in the obtained key top 11 was even and flat. Thus, the key top body 12 had a satisfactory appearance.

In the key top 11 of the first example, the decorating layer 19, which was white, was visible around the graphical symbol layer 13, which was black. Further, the shadow of the black graphical symbol layer 13 fell on the white decorating layer 19, which made the black graphical symbol layer 13 stand out. When printing the white decorating layer 19, the solvent of the white paint did not infiltrate along the interface between the translucent resin film 14 and the key top body 12. In this manner, the key top 11 was obtained with high quality.

Example 2

In example 2, the key top 11 having the structure of the second embodiment was manufactured.

First, graphical symbol layer 13 in the form of a symbol of a telephone was printed with red paint on the rear surface 14a of the translucent resin film 14, which was formed from polymer alloy of polycarbonate resin and polybutylene terephthalate resin. The resin film 14 was drawn with a jig and deformed to generally conform to the front profile of a key top body 12.

Subsequently, the drawn resin film 14 was arranged between the upper mold 20 and the lower mold 21 shown in FIG. 4(a). Then, the molds 20 and 21 were clamped. Molten polycarbonate resin was injected into the cavity 25 through the resin injection gate 26 of the lower mold 21 to form the key top body 12, which had the extending pieces 16. Accordingly, the translucent resin film 14 was integrated on the translucent key top body 12 by thermal fusion, in the same manner as in the first embodiment.

Then, a translucent aluminum foil was transferred onto the rear surface 12a of the key top body 12 by hot stamping to form the decorating layer 19. In this manner, the key top 11 shown in FIG. 5 was manufactured. In the manufactured key top 11, the rear surface 12a of the key top body 12 formed a flat and even plane, and the key top body 12 had a satisfactory appearance.

In the key top 11 of the second example, the decorating layer 19, which had a silver metallic luster, was visible around the graphical symbol layer 13, which was red. Further, the shadow of the red graphical symbol layer 13 fell on the silver metallic luster decorating layer 19, which made the red graphical symbol layer 13 stand out.

The present examples and embodiments are to be considered as illustrative and not restrictive, and the invention is not to be limited to the details given herein, but may be modified within the scope and equivalence of the appended claims.

What is claimed is:

1. A key top formed by molding with a mold having a mold gate and a mold vent, the key top comprising:
   a resin film having a front surface and a rear surface;
   a key top body made of resin, said key top body having a rear surface and a peripheral surface, said key top body being covered by the resin film except for the rear surface thereof; and a first extending portion having a rear surface and extending outward from the peripheral surface of the key top body, said first extending portion including a gate mark formed by the mold gate and a vent mark formed by the mold vent when molding the key top body, which are located on the rear surface of the first extending portion, wherein the rear surface of the key top body and the rear surface of the first extending portion are flat and extend along a plane located rearward from the rear surface of the resin film.

2. The key top according to claim 1, further comprising a second extending portion extending outward from the first extending portion, the second extending portion having a rear surface extending along the same plane as the rear surface of the first extending portion.

3. The key top according to claim 1, wherein the first extending portion comprises a pair of extending pieces each having a rear surface and arranged at opposite positions on the peripheral surface of the key top body, with the gate mark located on the rear surface of one of the extending pieces, and the vent mark located on the rear surface of the other of the extending pieces.

4. The key top according to claim 1, wherein the first extending portion comprises a flange extending along the entire periphery of the key top body.

5. The key top according to claim 1, wherein a graphical symbol layer is formed on at least one of the front surface and the rear surface of the resin film.

6. The key top according to claim 1, wherein a decorating layer is formed on the rear surface of the key top body.

7. The key top according to claim 6, wherein the decorating layer has a metallic luster.

8. The key top according to claim 1, wherein the first extending portion has a thickness and a length, by which the first extending portion extends from the peripheral surface of the key top body, wherein the thickness is less than the length.

9. The key top according to claim 2, wherein the first extending portion comprises a pair of extending pieces each having a rear surface and arranged at opposite positions on the peripheral surface of the key top body, with the gate mark located on the rear surface of one of the extending pieces, and the vent mark located on the rear surface of the other of the extending pieces.

10. The key top according to claim 2, wherein the first extending portion comprises a flange extending along the entire periphery of the key top body.

11. The key top according to claim 2, wherein a graphical symbol layer is formed on at least one of the front surface and the rear surface of the resin film.

12. The key top according to claim 2, wherein a decorating layer is formed on the rear surface of the key top body.

13. The key top according to claim 12, wherein the decorating layer has a metallic luster.

14. The key top according to claim 2, wherein the first extending portion has a thickness and a length by which the first extending portion extends from the peripheral surface of the key top body, wherein the thickness is less than the length.

15. A mold for forming a key top by injecting resin therein, the mold comprising:
(a) an upper mold section including a first cavity formed in the upper mold section, the first cavity having a rim from which a step out recess extends, surrounding the first cavity, and the step-out recess having a depth less than that of the first cavity, and
(b) a lower mold section adapted to mate with the upper mold section, the lower mold section including a second cavity formed in the lower mold section, the second cavity having an area that opposes the step-out recess when the mold sections mate together, said area including a gate for injecting resin into the cavities when the mold sections mate together, and a vent for venting gas from the cavities as resin is injected.

16. The mold of claim 15, wherein the vent and gate oppose one another across the second cavity.

17. The mold of claim 15, wherein the second cavity is shallower in depth than that of the step-out recess.

18. A method of forming a key top, the method comprising:
(a) injecting resin in non-solid form into a mold to form a key top body with the key top body including an outwardly extending portion, from where the resin is injected and from which gas is vented, and the resin being translucent when solidified;
(b) solidifying the resin;
(c) forming a graphic symbol on a translucent resin film; and
(d) fusing the translucent resin film to the upper surface of the key top body, with the graphic symbol being surrounded by the extending portion from a plan view of the key top body.

19. The method of claim 18, wherein said fusing is performed with said injecting by disposing the translucent resin film in the mold and thereafter performing said injecting.

20. The method of claim 18, further comprising forming a decorating layer on the lower surface of the key top body.

* * * * *